(12) United States Patent
Fernandez

(10) Patent No.: US 6,901,375 B2
(45) Date of Patent: May 31, 2005

(54) METHODS AND APPARATUS FOR ELECTRONICALLY STORING AND RETRIEVING VALUE INFORMATION ON A PORTABLE CARD

(75) Inventor: Alberto Fernandez, Miami, FL (US)

(73) Assignee: XTec, Incorporated, Miami, FL (US)

( * ) Notice: Subject to any disclaimer, the term of this patent is extended or adjusted under 35 U.S.C. 154(b) by 605 days.

(21) Appl. No.: 09/844,105

(22) Filed: Apr. 27, 2001

(65) Prior Publication Data

US 2001/0016827 A1 Aug. 23, 2001

Related U.S. Application Data

(63) Continuation of application No. 08/963,181, filed on Nov. 3, 1997, now Pat. No. 6,266,647.

(51) Int. Cl.[7] .............................................. G06F 17/60
(52) U.S. Cl. .............................. 705/14; 714/5; 713/161
(58) Field of Search ....................... 705/14, 3; 713/160, 713/161, 191, 186, 176; 382/125, 115, 116, 119, 124; 714/5, 6, 8; 235/375, 377, 378

(56) References Cited

U.S. PATENT DOCUMENTS

| | | | | |
|---|---|---|---|---|
| 5,598,474 A | * | 1/1997 | Johnson | 380/23 |
| 6,266,647 B1 | * | 7/2001 | Fernandez | 705/14 |
| 6,314,196 B1 | * | 11/2001 | Yamaguchi et al. | 382/125 |

FOREIGN PATENT DOCUMENTS

JP    4110007412 A   *   1/1999

OTHER PUBLICATIONS

IBM Technical Disclosure Bulletin; Mar. 1990, Disk-Access Storage Drive Retaining Device.*

* cited by examiner

Primary Examiner—Pierre Elisca
(74) Attorney, Agent, or Firm—Priest & Goldstein

(57) ABSTRACT

A value storage system in which information representing value is directly written to an easily portable storage medium as a reference fingerprint. The value storage system includes a plurality of read/write units for storing and retrieving the value information. Each of the read/write units may include a data authenticator for authenticating information previously stored on the storage medium, the authentication information consisting of a numerical representation of a level of trapped charges representing the reference fingerprint. The read/write units may be connected to a central server which retrieves information from each of the read write units, stores information, and provides various accounting and statistical analyses, as well as reconciling transactions between two or more read/write units. The value stored may represent units of value employed in a customer loyalty program which are stored on the portable media during a sales transaction and then later redeemed for purchase of or discounts on merchandise, a gaming player's points or winnings, or any of a host of types of value related information which may be carried on a portable card.

22 Claims, 7 Drawing Sheets

METHODS AND APPARATUS FOR ELECTRONICALLY STORING AND RETRIEVING VALUE INFORMATION ON A PORTABLE CARD

This Application is a continuation of Ser. No. 08/963,181, filed on Nov. 3, 1997 Now U.S. Pat. No. 6,266,647.

FIELD OF THE INVENTION

This invention relates generally to electronic information storage, and more particularly, to a system for electronically storing and retrieving value related information on a portable card.

BACKGROUND OF THE INVENTION

Electronic value storage systems have gained widespread acceptance over the past thirty years or so, but the scope of applications in which they can be used continues to be limited. This is because the value storage system typically consists of a central database, with debits and credits being made at the database. A customer is typically issued a plastic card with a magnetic stripe identifying the customer's account. The card typically contains no balance information or other information besides the customer's account number or other identifying number.

The card typically contains no security provisions. Instead, security is provided by a separate access code or personal identification number (PIN) preferably memorized by the customer, which must be provided along with the card in order for the card to operate. The access code is preferably stored at the central database along with the identifying number found on the card.

The cards utilized in conjunction with the central database system are quite inexpensive, but the cost of the cards represents only a trivial portion of the cost of the overall system. The system is dependent on one or more central databases, each of which can be quite expensive. Moreover, the databases must be accessible to every terminal at which the card might be used. A typical system thus requires a card; a card reader at the point of sale; a central database at the customer's home bank; and a telecommunications network which must be able within seconds to establish a connection between a point-of-sale terminal in, for example, Kuala Lumpur, Malaysia, and a central database in, for example, New York City.

The need for a large central database, which may need to be accessible over a wide area, increases the cost of the system and makes it impractical for a small merchant who may, for example, wish to institute an automated customer loyalty tracking and rewards program. For such an application, it would be preferable to have value stored on the card itself. In this way, a decentralized system of cards and readers could be created which was no larger than necessary to serve the required number of point-of-sale terminals. Unlike the case in which a central database was used, the decentralized network would not require a central data storage location in order to operate. Moreover, under normal operation, one reader would not necessarily need to be in contact with another reader, but instead could execute its transactions independently.

Card systems, such as the SMARTCARD® have been introduced in which information is stored directly on the card, but these systems suffer from several drawbacks. First, the cards and the readers are expensive. The cards range in price from $3.50 to $13.00, while the readers range in price from $59.00 to $420.00 and the transaction costs range from $0.02 to $0.16. The cost of the card, in particular, is a significant factor, and limits the flexibility of practical uses of the card. It would be impractical, for example, to use the card for a one-time, limited duration promotion, as the benefits to be derived over a limited time would not cover the cost of the cards. Moreover, the cost of the card readers and of the transactions limit the base of customers who may be able to use the cards.

Cards such as the SMARTCARD® also have limited security. The danger therefore exists that fraudulently manufactured cards will be used, thus disrupting the business of legitimate customers.

A need therefore exists in the art for a low-cost, high-security system for electronic storage of value on an easily transportable medium such as a card.

SUMMARY OF THE INVENTION

According to one embodiment of the invention, a value storage system is provided in which value is stored on a transportable medium. Information representing the value is preferably stored on the medium in semiconductor memory cells of a semiconductor device. A numerical data string is generated, called a reference fingerprint, representative of the data stored in the memory cells. The reference fingerprint is related to numerical representations of the precise levels of trapped charges present in the memory cells at the time data is programmed. An EEPROM is suitably used as the semiconductor memory device. A reader/writer retrieves information from the device and writes information to the device by conventional means. The EEPROM is authenticated via the reference fingerprint. If the actual reference fingerprint matches the expected reference fingerprint, then a match occurs and data is read from or written to the EEPROM, as desired.

The authenticated data may be suitably used in an application such as a customer loyalty program. Each of a number of customers is issued a low cost card containing an EEPROM, on which information can be securely recorded. A plurality of read/write units are suitably furnished, each read/write unit being capable of securely storing data on, and reading data from, a customer's card. Each card may contain various data which can be read and employed in various recordkeeping, accounting and statistical functions. While a networked system could be employed, each read/write unit is capable of operating independently from the others, reading and writing data to each card, and maintaining a log of information relating to transactions from each card.

Each card is preferably encoded with identifying information, and used in sales transactions for the storage of bonus points related to each transaction. Bonus points may be awarded for sales transactions, and subsequently used for the purchase of, or discounts on, merchandise. Read/write units and cards may be connected to a central server to facilitate the transfer and maintenance of information on a storewide basis.

As an exemplary alternative, the presently disclosed cards and card systems may be suitably employed in a gambling or gaming context, such as in conjunction with Pachinko games, slot machines, off track betting ("OTB") or the like. In such a system, a winner's winnings or points may be stored on a card and then redeemed at a later date without the need of tickets, chips or prizes. One or more merchants, stores or other authorized providers can then redeem the points or winnings. For example, a bank could pay out a winner's winnings, or a store could provide merchandize. Gaming points or winnings might be stored in a separate register or the same register containing points from another loyalty program. Similarly, multiple loyalty programs might have separate point total registers or the same register depending upon the relationship of the participants in the programs. It will be recognized that other sources of value related information could also be used in conjunction with the present system.

A more complete understanding of the present invention, as well as further features and advantages of the invention, will be apparent from the following Detailed Description and the accompanying drawings.

DETAILED DESCRIPTION

Figure 1:
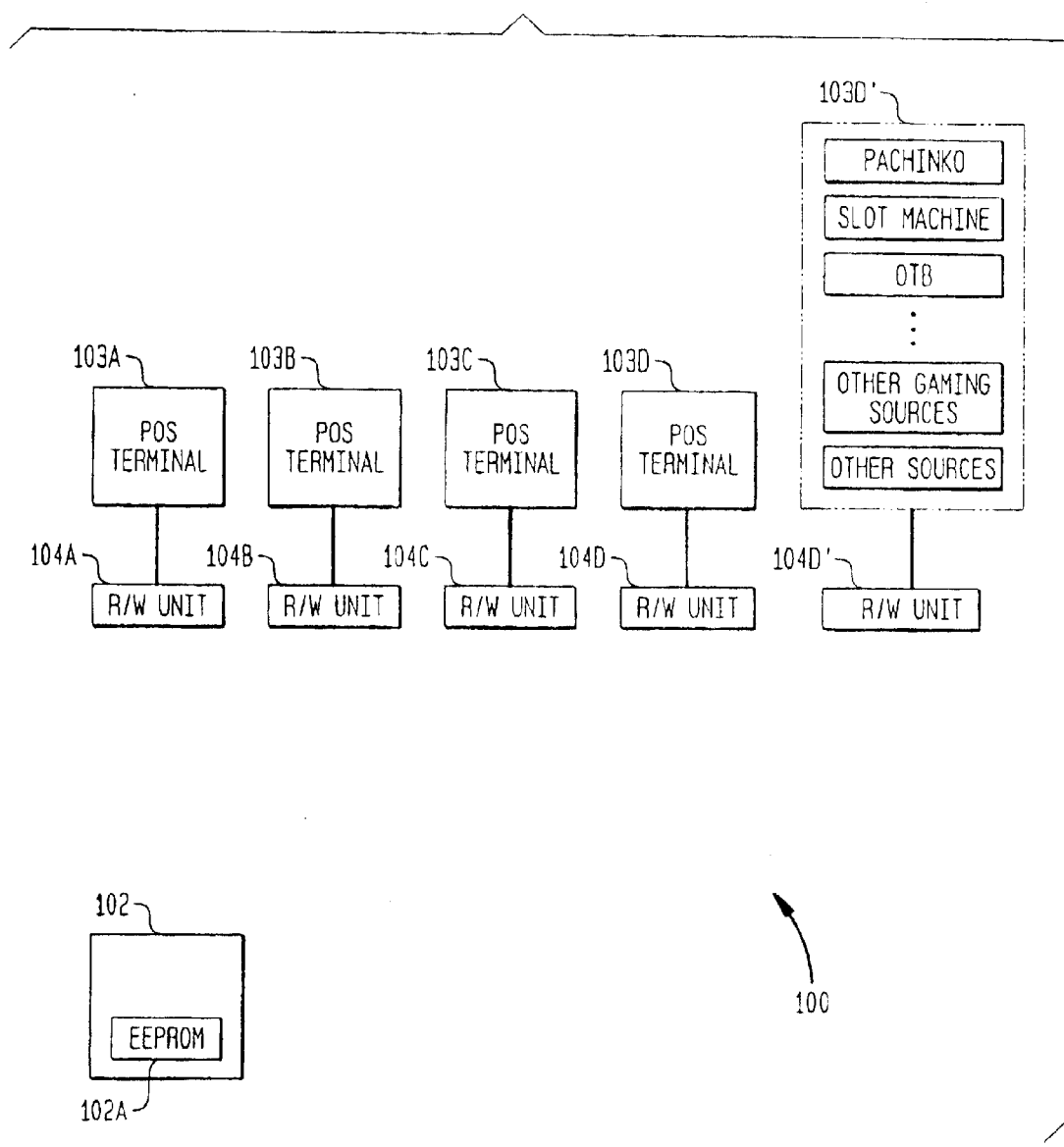
FIG. 1 illustrates a value storage system employing the methods and apparatus of the present invention.

FIG. 1 shows a value storage system 100 according to the principles of the present invention. System 100 is suitably adapted to the administration of a consumer or customer loyalty program operated by a merchant with a plurality of branches in a particular geographic area. System 100 includes a plurality of cards, of which an illustrative example is card 102, which are used as an easily transportable medium for the storage of data or information, such as value indicia, customer identification, customer profile information, bonus points based upon the dollars spent by the customer, points, gaming winnings, or the like. Card 102 preferably contains an EEPROM 102A for the storage of data, suitable for use with a data security system according to the teachings of Fernandez U.S. Pat. No. 5,644,636 ("Fernandez"), which is incorporated herein by reference. The use of the data security system of Fernandez in conjunction with the teachings of the present invention protects against counterfeiting and provides for a high level of confidence in the integrity of the data without the need for complicated and expensive communications systems to verify each individual transaction.

System 100 further includes card read/write units 104A–D, each of which is adapted to operate with any of the cards such as card 102. The units 104A–D way be located in a single store or distributed through a number of stores. Although four units are shown, it will be recognized that a smaller or larger number of units may be readily employed as desired.

When a merchant desires to institute a loyalty program, he can purchase a supply of cards and purchase or lease sufficient read/write units to serve his point of sale locations. The supplier can program the read/write units to operate the loyalty program, as desired by the merchant. The merchant then distributes cards 102A–N to his customers, who then present the cards to the merchant whenever they make purchases. For example, suppose that a customer has been given card 102, and makes a purchase at the point of sale terminal 103A which is served by read/write unit 104A. The customer presents the card 102 to the merchant, who inserts card 102 into read/write unit 104A. Read/write unit 104A receives information about the sale from point-of-sale terminal 103A, calculates an appropriate amount of value to add to card 102, reads the value on card 102, updates the value on card 102 by adding the additional value to the presently existing value, and writes the updated value on the card 102.

When a customer desires to redeem credit, he presents card 102 to the merchant, who inserts the card into read/write unit 104A. The merchant enters the amount of credit to be redeemed. Read/write unit 104A debits the value of card 102A accordingly, in a process similar to that described above, and transmits the redeemed value to point-of-sale terminal 103A, which calculates appropriate credit for the redemption, and adjusts the balance due for the sale accordingly. While an exemplary loyalty program is described above, it will be recognized that the present invention may be adapted to a wide variety of such programs.

For example, the present invention may be applied to Pachinko, gaming, gambling, or the like. Further specific examples might be off track betting, lotteries, and casinos. to this end, system 100 is shown as including a further source of value related information 103D' connected to a read/write unit 104D'. Exemplary sources within further source 103D' are a Pachinko machine, a slot machine, OTB, other gaming sources and other sources generally. The advantages provided by the present invention will be readily adaptable to a host of applications.

Figure 2:
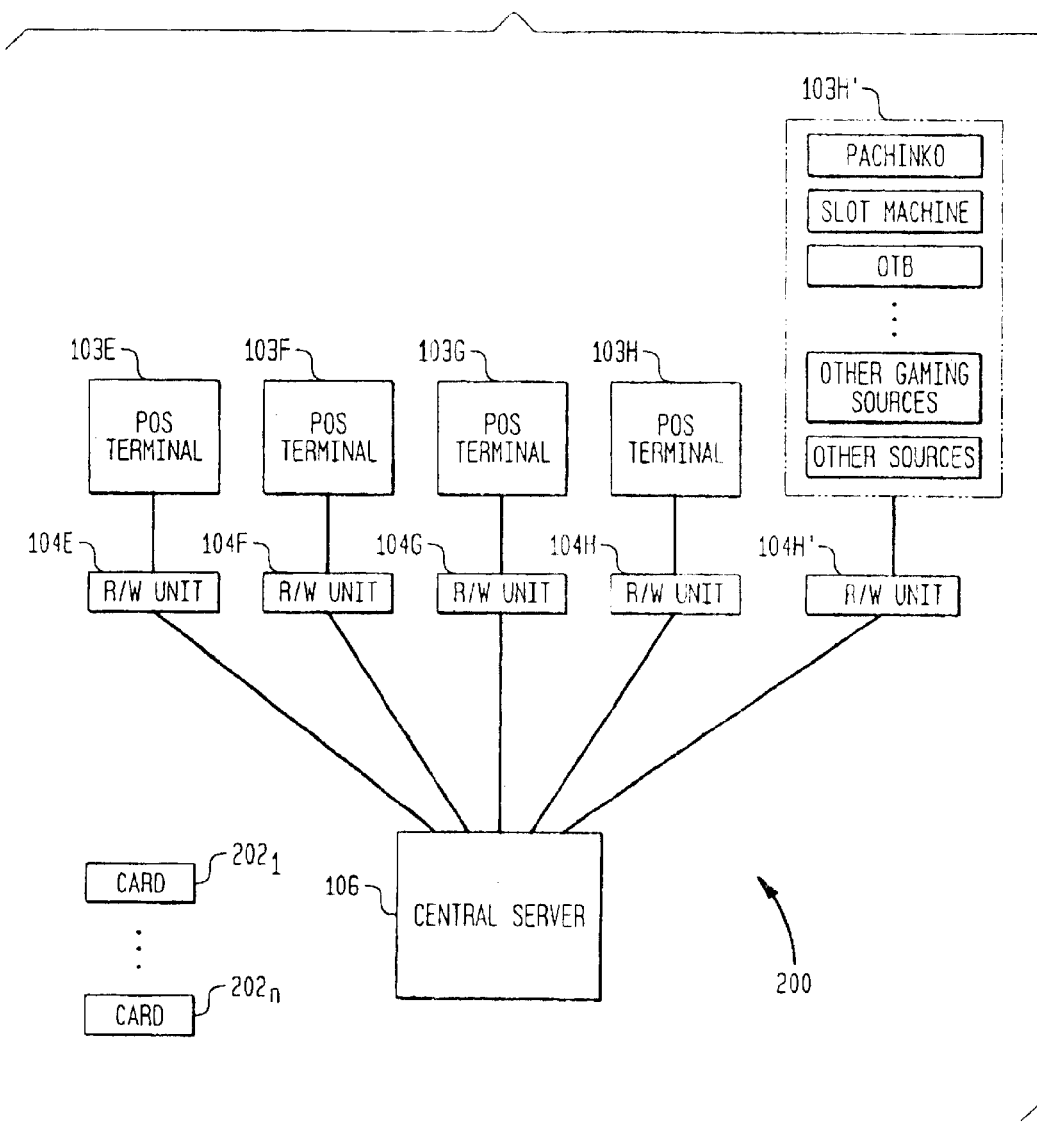
FIG. 2 illustrates an alternative embodiment of a value storage system according to the present invention, employing a central server to facilitate the transmission and processing of information.

FIG. 2 shows a loyalty system 200 in an alternative embodiment according to the present invention. System 200 includes cards $202_1$–$202_n$ similar to the card 102 illustrated in FIG. 1, point of sale terminals 103E–H and read/write units 104E–H. System 200 also includes a central server 106. Central server 106 is adapted to furnish updated information to each of the read/write units 104E–H upon request. This information may include criteria by which value is to be added to a card, criteria governing the amount of value to be added, rules governing the use of value for purchases or discounts, and the like. Through the use of central server 106, the operation of read/write units 104E–H can be conveniently updated.

Central server 106 also makes possible online operation of the loyalty system 200. While online operation does not require read/write units 104E–H to be in continuous communication with central server 106, or to have continuous access to central server 106, read/write units 104E–H can connect periodically with central server 106 to perform various online functions. It will be noted, however, that online operation is not needed for secure operation although it may be utilized in addition to the security presently provided. It will be recognized, however, that such redundant operation will eliminate much of the cost savings the present invention provides.

As was the case for the embodiment of FIG. 1, the online system 200 may be readily adapted to a variety of contexts, such as Pachinko, slot machines, OTB, other gaming applications and other applications generally. To this end, FIG. 2 additionally shows a further source 103H' and read write unit 104H' connected to the central server 106.

Figure 3:
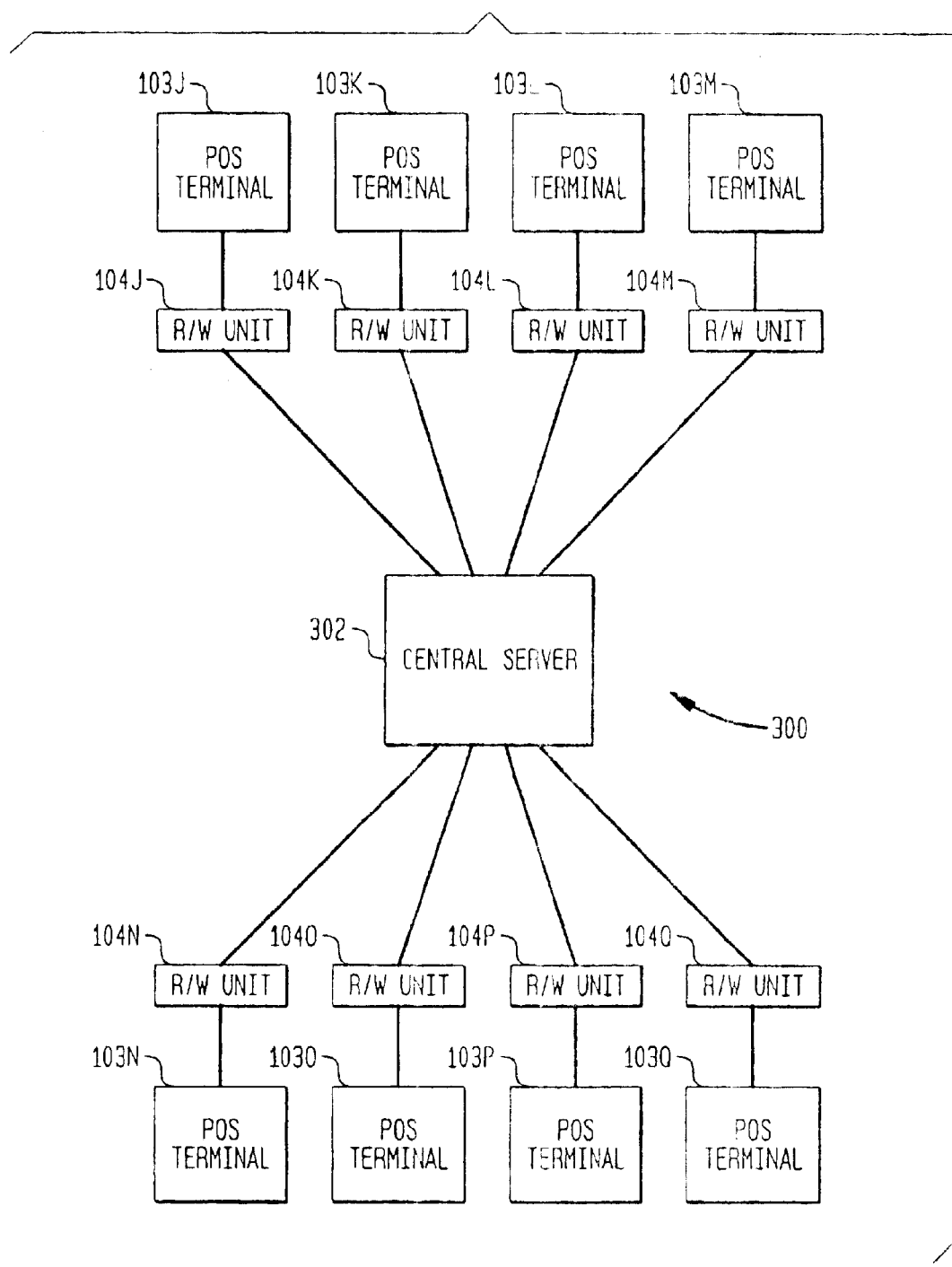
FIG. 3 illustrates a multi-merchant cooperative loyalty system according to the present invention.

FIG. 3 illustrates a multi-merchant cooperative loyalty system 300 in accordance with the present invention. For purposes of simplification, system 300 will be described in terms of two merchants including a supply of interchangeable cards (not shown) which will preferably be similar to card 102; first set of read/write units 104J–M, belonging to a first merchant, read/write units 104J–M connected to a first set of POS terminals 103J–M, respectively; a second set of read/write units 104N–Q belonging to a second merchant, a second set of read/write units 104N–Q which are connected to a second set of POS terminals 103N–Q, respectively, and a central server 302.

The inclusion of the central server 302 in the loyalty system 300 allows the communication needed to operate a cooperative loyalty program, but without the necessity of maintaining continuous contact or access between read/write units 104J–M, 104N–Q, and central server 302. Instead, each of the read/write units 104J–M and 104P–Q will preferably establish contact with central server 302 either on demand or at prearranged times, transmitting information for central server 302 to store and administer. In other words, contact will not be necessary on a transaction by transaction basis. For example, each of the read/write units may desirably transmit its daily transaction log to the central server 302. Central server 302 can then use the transmitted logs to maintain and update stored information, which it can then process so as to administer the loyalty program. For example, central server 302 can make current information available on request, and can print a batch report at any time. Central server 302 can maintain a file for each merchant, which is updated periodically. Central server 302 can use the transaction log files received from the read/write units to produce marketing analysis reports.

Moreover, central server 302 can perform a reconciliation function similar to that of a clearinghouse. After the transaction logs of all of the read/write units have been transmitted to the central server, the central server identifies points earned and redeemed, and allocates them properly between merchants. Imbalances in point redemptions can be settled between merchants according to prior arrangements.

Figure 4:
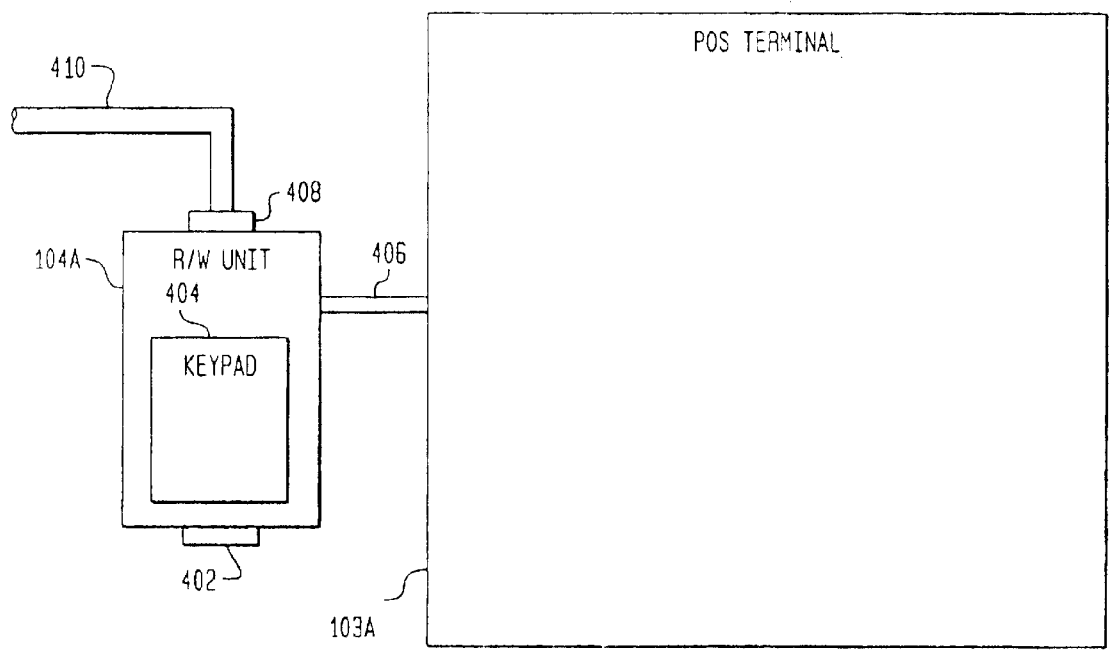
FIG. 4 illustrates a card read/write unit according to the present invention, shown connected to a point-of-sale terminal.

FIG. 4 is a more detailed illustration of a read/write unit 104A and its operation according to the present invention. The read/write unit 104A is shown connected to a point-of-sale terminal 103A, with which the read/write unit 104A preferably communicates. The read/write unit 104A includes a slot 402 for insertion of a card, such as the card 102 illustrated in FIG. 1. The read/write unit 104A also includes a keypad 404 for direct entry of data. The read/write unit 104A further includes a POS connection 406 to the point of sale terminal 103A, as well as a server connection 408 which may be used to connect the read/write unit 104A to a central server, such as the central server 302 illustrated in FIG. 3.

The server connection 408 can be an ordinary telephone data interface such as a modem, allowing the read/write unit 104A to be connected to the server over a conventional telephone line 410. Read/write unit 104A is suitably used in connection with a customer loyalty program, in which a customer is awarded points for participating purchases, and is able to redeem those points for merchandise or services.

Read/write unit 104A may suitably perform all point award and redemption functions, and maintain a log of all points awarded and redeemed. Read/write unit 104A is suitably programmed with loyalty program parameters, which may include frequency and monetary data, and information based on the merchant's own marketing strategy. Moreover, points are preferably identified with the issuing merchant, and their usability is defined. For example, points may be redeemable at only the issuing merchant, at any of the participants of a multiparticipant loyalty program, or at a subset of the participants of a multiparticipant loyalty program. Typically, the parameters of operation of read/write unit 104A are programmed in when read/write unit 104A is installed. Alternatively, new or updated parameters of operation can be downloaded from the central server.

During typical operation of the read/write unit 104A, a customer gives his card to a sale clerk who inserts it into the read/write unit 104A. If the sale is a normal sale in which points are to be awarded, the sales clerk then performs the sales transaction normally. The point of sale terminal 103A transmits the sales information to the read/write unit 104A. The read/write unit 104A then computes the number of points to be awarded and updates the value stored on the card. Alternatively, the point transaction can be entered directly onto the keypad 404.

If the transaction is to be a redemption of points, the customer gives the card to the sales clerk, who inserts the card into the read/write unit 104A and processes the transaction on the point of sale terminal 103A. The read/write unit 104A then deducts the desired number of points from the card and updates the value of the card. The read/write unit 104A simultaneously transmits a credit entry to the point of sale terminal 103A reflecting the value of the points deducted. The read/write unit 104A prints a receipt for each transaction, showing the transaction and the current point total. Points can also be redeemed by entering the transaction directly onto the keypad 404. The redemption transaction can then be manually entered into the point of sale terminal 103A.

Figure 5:
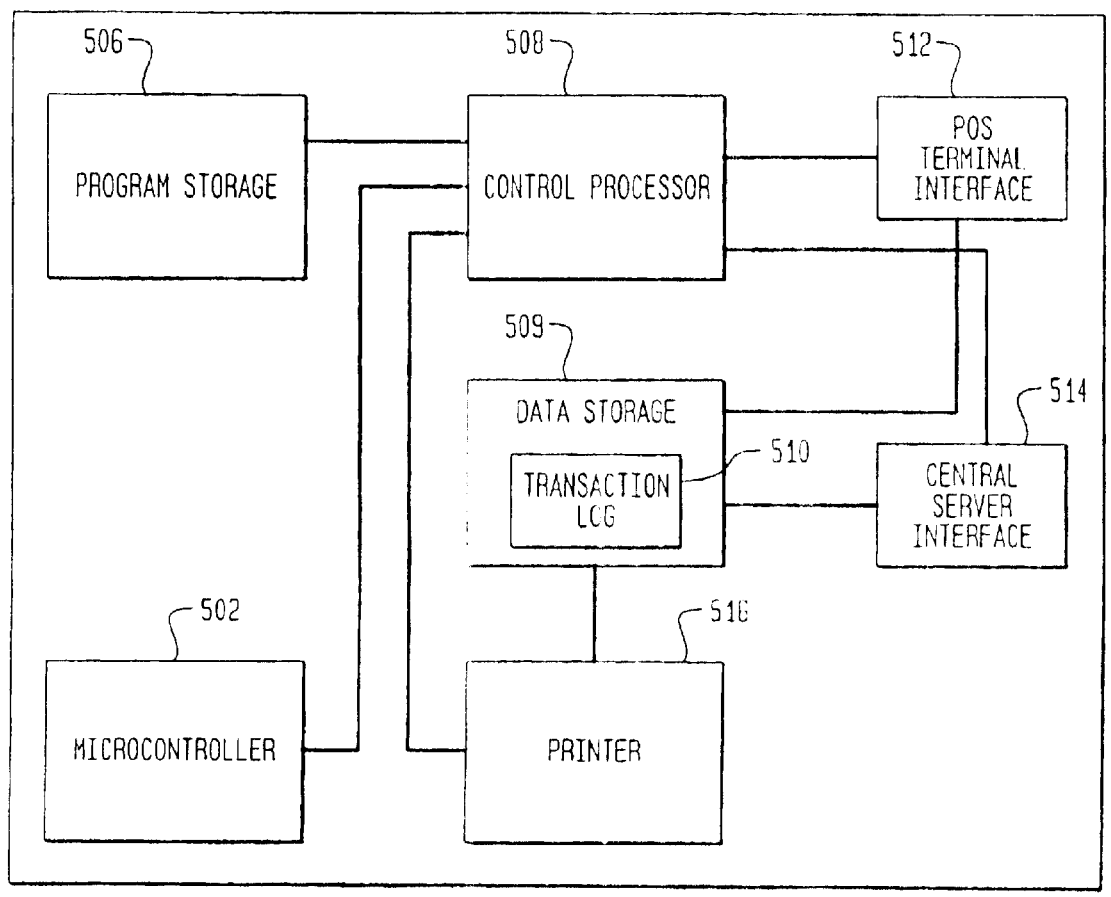
FIG. 5 is a functional block diagram of a read/write unit according to the present invention.

FIG. 5 is a functional block diagram of a read/write unit 104A according to the teachings of the present invention. Read/write unit 104A preferably includes a microcontroller 502, program storage 506, control processor 508, data storage 509, a portion of which is dedicated to transaction log 510, POS interface 512, central server interface 514 and printer 516. Microcontroller 502 is preferably adapted to read and write data to an EEPROM, and is preferably further adapted to provide data security according to the teachings of Fernandez U.S. Pat. No. 5,644,636 ("Fernandez"), incorporated herein by reference. In writing data, therefore, microcontroller 502 stores a reference fingerprint corresponding to numerical representations of a measurement of the levels of charges trapped in the memory cells. In reading data, microcontroller 502 makes comparisons of the reference fingerprints for authentication. Upon insertion of a card, microcontroller performs authentication by checking the reference fingerprint. If authentication passes, read/write unit 104A functions normally. If authentication fails, read/write unit 104A will not perform any operations on the card. The secure card provides a level of security which can be recognized at the read/write unit making it unnecessary to perform online verification of the validity of the card. The card may include a user personal identification number (PIN) in fingerprint form which the user will then key in so that protection is provided against lost or stolen cards.

Control processor 508 controls the operation of read/write unit 104A, under the control of programming stored in program storage 506. Standard programming is placed in program storage 506 at the time of manufacture of read/write unit 104A, with supplemental programming being stored when read/write unit 104A is to be installed in a customer location. Alternatively, supplemental programming can be updated by instructions received through server interface 512, from a central server such as central server 302 described in connection with the discussion of FIG. 3.

During typical operation, read/write unit 104A communicates with a connected point of sale terminal through POS interface 512. Read/write unit 104A receives instructions and data from the point of sale terminal, and these instructions and data are processed by control processor 506, which then directs appropriate actions by microcontroller 502.

For example, if loyalty points are to be awarded, the point of sale terminal transmits the sale data to the control processor 506 over the POS interface 514. The control processor logs the sale data in the transaction log 510 and microcontroller 502 to write updated information on the card. For security, this data may be written as a reference fingerprint. The control processor also directs printer 516 to print a transaction receipt reflecting the transaction as entered in the log.

If loyalty points are to be redeemed, this information is entered into the point of sale terminal as the method of payment for the transaction. The point of sale terminal directs the read/write unit to redeem an appropriate number of points. This directive is transmitted via POS interface 512 to the control processor 506. The control processor 506 directs microcontroller 502 to check the card for a sufficient number of points. If the number of points on the card is insufficient, the control processor reports a failure to the point of sale terminal, which then rejects the transaction. If the card contains a sufficient number of points, write unit 504 updates the value on the card, again writing the new data as a reference fingerprint, and control processor 506 reports to the point of sale terminal that the transaction was successful. The point of sale terminal then applies the value of the points as a credit toward the purchase price of the product for which redemption is being made.

Figure 6:
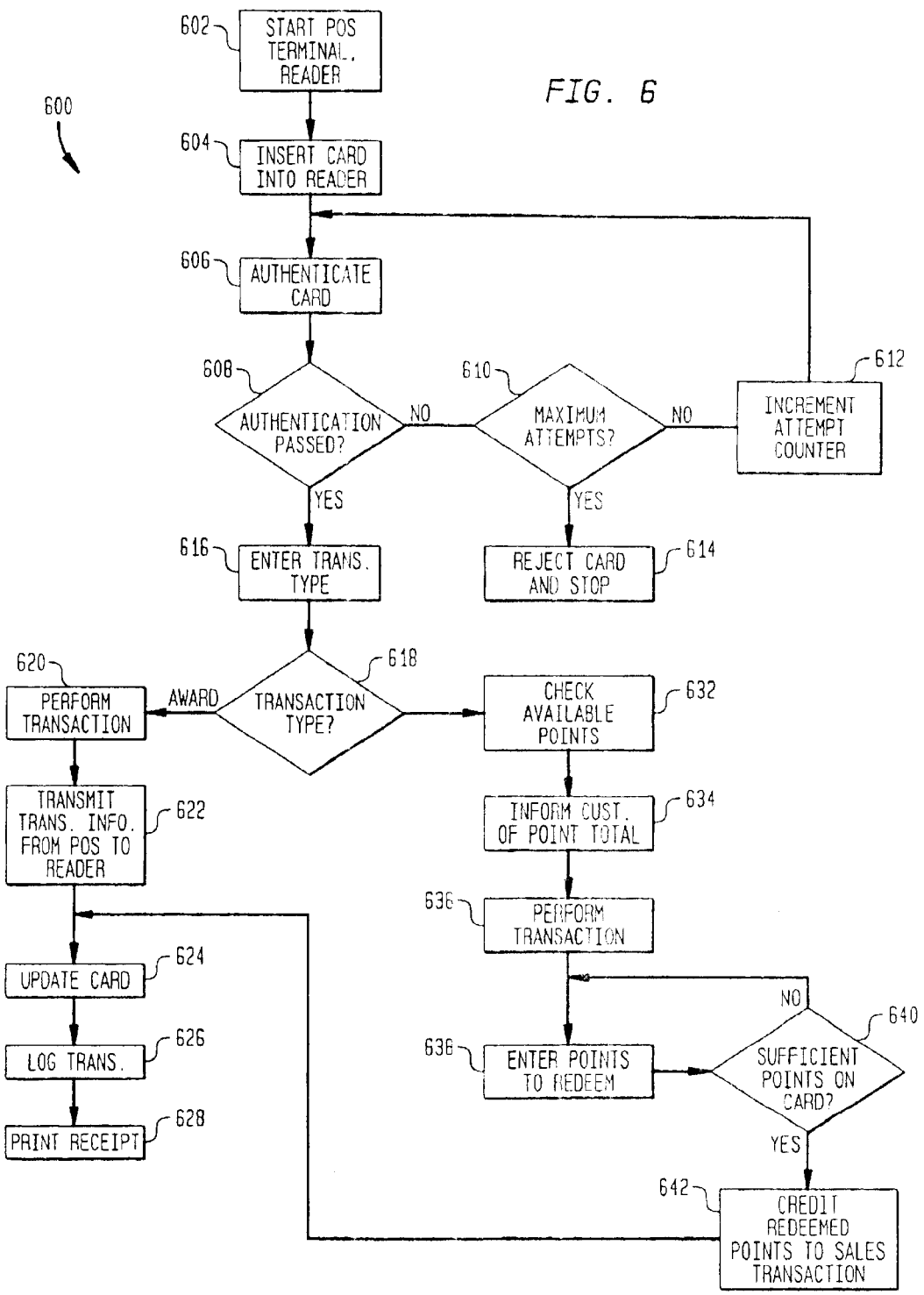
FIG. 6 is a flowchart illustrating a method of monitoring and rewarding customer loyalty according to the present invention.

FIG. 6 is a flowchart showing the steps for processing a transaction according to the teachings of the present invention. At step 602, the point of sale terminal and read/write unit are initialized. Next, at step 604, a card is inserted into the read/write unit. Next, at step 606, the card is checked for authenticity. Next, at step 608, the authenticity of the card is evaluated, for example, by checking that an identification number stored as a reference fingerprint is valid. If the authenticity check fails, control is transferred to step 610 and the number of validation attempts is checked to determine whether the number of attempts has reached a predetermined maximum. If the predetermined maximum has not been reached, control is transferred to step 612, the number of attempts is incremented and control is returned to step 608. If the predetermined maximum has been reached, control is transferred to step 614 and the number of attempts is reset, the card is rejected, and the transaction is terminated.

If the evaluation of the authentication at step 608 is successful, control is transferred to step 616 and the transaction type is selected. The transaction can be a sales transaction for which points will be awarded, or a transaction for the redemption of points. If the transaction is to be one for which points will be awarded, control is transferred to step 620 and the sale is transacted in the normal manner. After completion of the sale, control is transferred to step 622 and the point of sale terminal sends the sale information to the read/write unit. Next, at step 624, the read/write unit updates the card with the new point total. To prevent possible forgery, the new point total may be advantageously recorded as a reference fingerprint. Next, at step 628 the read/write unit logs the transaction. Finally, at step 630 the read/write unit prints a receipt showing the transaction details and the updated point total.

If the transaction type entered at step 616 is a redemption of points, control is transferred to step 632 and the point total on the card is checked. Next, at step 634, the point total is displayed and the customer informed of the point total. Next, at step 636, the transaction is performed as an ordinary sales transaction, to the point at which the amount due is arrived at. Next, at step 638, the number of points to be redeemed is entered. Next, at step 640, the point total on the card is checked to determine if the card contains the number of points entered. If the point total on the card is insufficient, control is transferred to step 638 and a new amount entered. Control is then transferred back to step 640, and the total again checked. When the amount entered is less than or equal to the amount contained on the card, control is transferred to step 642 and the value of the number of points redeemed is transferred to the point of sale terminal as a cash amount to be applied to the sale. The sale transaction is then completed, with the customer supplying additional payment if the number of points redeemed is insufficient to cover the cost of the merchandise purchased. Control is then transferred to step 624, and the card updated, preferably as a reference fingerprint, the transaction is logged, and a receipt is printed, as described above.

Figure 7:
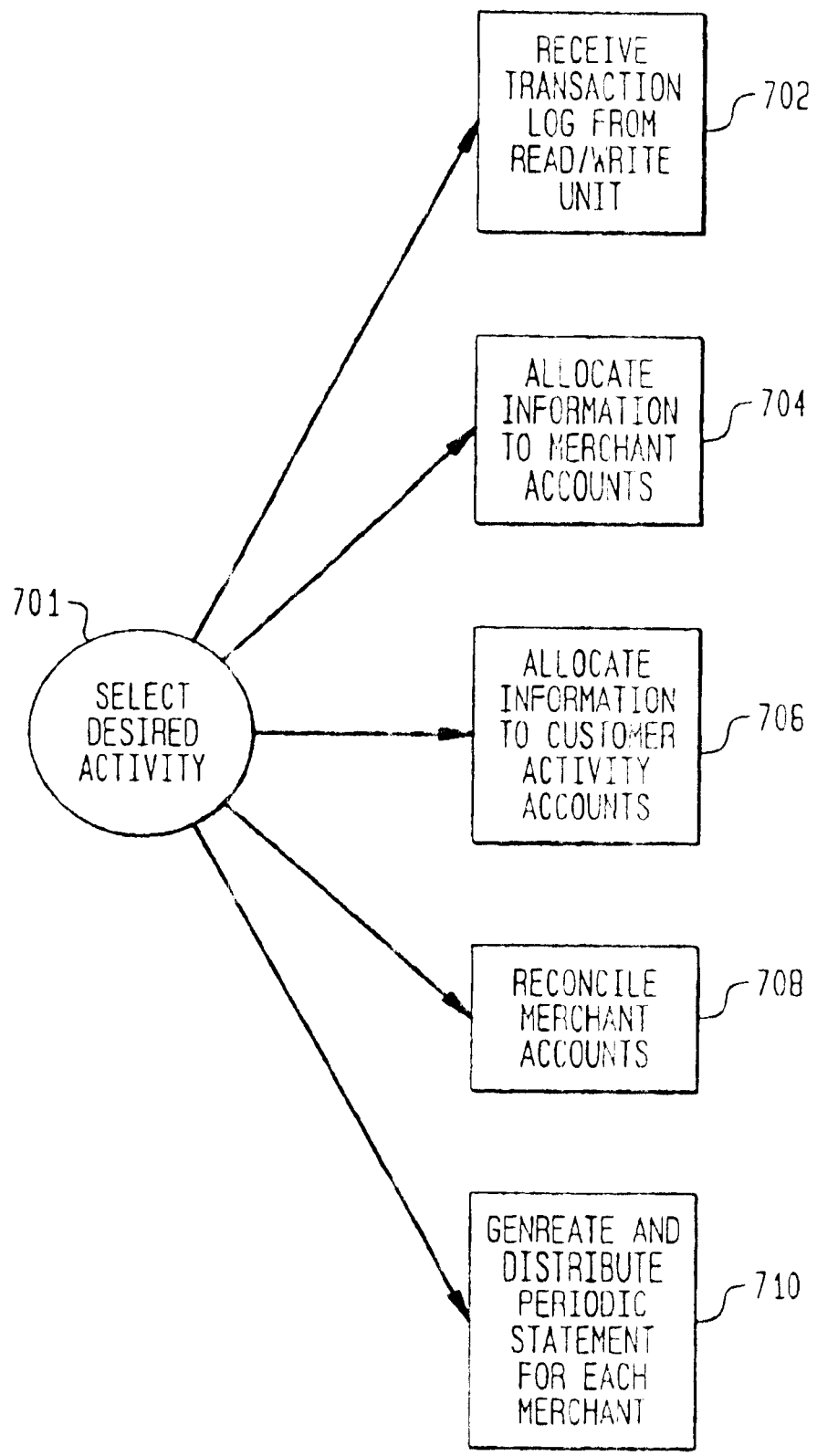
FIG. 7 is a flowchart illustrating a method of receiving and processing information in a multi-merchant customer loyalty system according to the present invention.

FIG. 7 is a flowchart showing the steps of receiving and processing information from a plurality of read/write units forming part of a multi-merchant loyalty system according to the teachings of the present invention. Control begins at step 701, where the desired function is chosen. Control is then transferred to the chosen step, and, after the execution of the chosen step is completed, back to step 701, where the next desired step is chosen.

At step 702, each of the transaction logs of each of the read/write units is received. At step 704, the information in each of the transaction logs is appropriately allocated to an account for each merchant, showing the number and value of points awarded and redeemed, as well as other information which is desired to be tracked. At step 706, information from the transaction logs is allocated to an activity account for each customer, showing points earned and redeemed during a period, purchased preferences, and other desired information. Customer activity information can be filtered for the purpose of determining target audiences for marketing information and special offers.

At step 708, merchant accounts for participants in shared point programs are reconciled, with point issuances and redemptions offset between different merchants, and payments between merchants being allocated for any imbalances.

At step 710, a periodic statement is generated and distributed to each merchant, showing point activity and other desired information.

The steps illustrated by the flowchart in FIG. 7 need not occur sequentially; rather, each step can be executed as desired. Receipt of the transaction logs preferably occurs at least daily, and generation and distribution of the merchant statements typically occurs monthly, but each step can be executed at whatever frequency, and in whichever order, is desired.

While the present invention is disclosed in the context of a presently preferred embodiment, it will be recognized that a wide variety of implementations may be employed by persons of ordinary skill in the art consistent with the above discussion and the claims which follow below. By way of example, cards, such as card 102 may be used for customer identification in conjunction with check cashing. Customer profile information may be stored on the cards. The cards may be suitably utilized as an electronic purse to store value, preferably stored as a reference fingerprint, which is then utilized to make purchases. Also, as previously noted, the present invention is widely applicable in contexts such as Pachinko, gaming, gambling, off track betting, lotteries and the like, as well as a host of other contexts in which cards and online card readers, or SMARTCARD® systems are presently used.

I claim:

1. An electronic value storage system, comprising:
a plurality of transportable solid-state media, each solid-state medium being adapted for the secure storage of information in a reference fingerprint representing characteristics of the media created by an instance of writing data to the media, the information representing stored value; and
a plurality of electronic read/write units, each read/write unit being adapted to store and retrieve data from ones of the solid-state media, the read/write units being further adapted to read and write authentication information in the form of an actual and an expected reference fingerprint from and to the solid-state media, the authentication information being resistant to duplication and serving to locally identify a solid-state device containing authentic stored value information without accessing a remote authentication unit.

2. The value storage system of claim 1, wherein each of the read/write units is programmable with criteria by which value is to be added to the media.

3. The value storage system of claim 2, wherein each of the storage media includes a plurality of memory cells.

4. The value storage system of claim 3, wherein each of the read/write units further includes a data authenticator for securing data written to the media, the data authenticator programming data into each memory cell by applying a voltage which causes charges to be trapped in the memory cell, making a measurement of the level of trapped charges in the memory cell after the memory cell is programmed, generating a numerical representation of the level of trapped charges as a reference fingerprint of the memory cell, and storing the numerical representation as the reference fingerprint.

5. An electronic storage system comprising:
transportable solid-state media storing value information in a plurality of memory cells, said media further storing a reference fingerprint representing characteristics of the media created by an instance of writing data to the media, the reference fingerprint representing measured levels of charges trapped in said memory cells containing said value information; and
a read unit for reading the value information and reading the reference fingerprint to determine if the value information is authentic.

6. The electronic storage system of claim 5 wherein the media comprises erasable programmable read-only memory.

7. The electronic storage system of claim 5 wherein the media comprises an electrically erasable programmable read-only memory.

8. The electronic storage system of claim 5 wherein the reference fingerprint is encrypted.

9. The electronic storage system of claim 5 wherein the value information comprises loyalty points earned through purchases.

10. The electronic storage system of claim 5 further comprising:
a write unit for writing updated value information in the plurality of memory cells and writing an updated reference fingerprint representing measured levels of charges trapped in said memory cells containing said updated value information.

11. The electronic storage system of claim 10 wherein the read unit and the write unit comprise a single read/write unit.

12. The electronic storage system of claim 5 further comprising a point-of-sale terminal communicatively connected to the read unit.

13. The electronic storage system of claim 5 further comprising a central server communicatively connected to the read unit for receiving information read from the media and providing information to the read unit.

14. An electronic storage system comprising:
a transportable device including solid-state media storing value information in a plurality of memory cells, and a second media storing a reference fingerprint representing characteristics of the media created by an instance of writing data to the media, the reference fingerprint representing measured levels of charges trapped in said memory cells containing said value information; and
a read unit for reading the value information and reading the reference fingerprint to determine if the value information is authentic.

15. The electronic storage system of claim 14 wherein the solid-state media comprises an erasable programmable read-only memory.

16. The electronic storage system of claim 14 wherein the solid-state media comprises an electrically erasable programmable read-only memory.

17. The electronic storage system of claim 14 wherein the reference fingerprint is encrypted.

18. The electronic storage system of claim 14 wherein the value information represents loyalty points earned through purchases.

19. The electronic storage system of claim 14 further comprising:
a write unit for writing updated value information in the plurality of memory cells and writing an updated reference fingerprint representing measured levels of charges trapped in said memory cells containing said updated value information.

20. A processing method comprising the steps of:
storing value information in a plurality of memory cells of a transportable solid-state media;
storing a reference fingerprint representing characteristics of the media created by an instance of writing data to the media, the reference fingerprint representing measured levels of charges trapped in said memory cells containing said value information;
reading the value information from the transportable solid state media;
reading the reference fingerprint; and
determining if the value information is authentic using the reference fingerprint.

21. The method of claim 20 further comprising, before the step of storing the reference fingerprint, the step of:
encrypting the reference fingerprint.

22. The method of claim 20 further comprising the steps of:
performing a retail transaction;
storing updated value information in the plurality of memory cells of the transportable solid-state media; and
storing an updated reference fingerprint representing measured levels of charges trapped in said memory cells containing said updated value information.

* * * * *